United States Patent [19]

Suyama et al.

[11] Patent Number: 5,153,013

[45] Date of Patent: Oct. 6, 1992

[54] METHOD FOR PREPARING FAT-AND-OIL-COATED SWEETENER COMPOSITIONS AND COMPOSITIONS SO PREPARED

[75] Inventors: Moriyuki Suyama; Keiichi Sakai, both of Kawasaki; Kazunori Ooi, Suzuka, all of Japan

[73] Assignee: Ajinomoto Co., Inc., Tokyo, Japan

[21] Appl. No.: 733,989

[22] Filed: Jul. 22, 1991

[30] Foreign Application Priority Data

Jul. 26, 1990 [JP] Japan ................... 2-198732

[51] Int. Cl.⁵ ............................... A23L 1/236
[52] U.S. Cl. ..................... 426/99; 426/548; 426/307; 426/302
[58] Field of Search ................. 426/99, 548, 307, 302

[56] References Cited

U.S. PATENT DOCUMENTS

| | | | |
|---|---|---|---|
| 4,465,694 | 8/1984 | Okada | 426/99 X |
| 4,511,584 | 4/1985 | Percel et al. | 426/99 |
| 4,704,288 | 11/1987 | Tsau et al. | 426/99 |
| 4,722,845 | 2/1988 | Cherukuri et al. | |
| 4,752,485 | 6/1988 | Sharma et al. | 426/99 |
| 4,753,807 | 6/1988 | Fuseya et al. | 426/99 |

FOREIGN PATENT DOCUMENTS 0053844  6/1982  European Pat. Off. .
0137326  4/1985  European Pat. Off. .

Primary Examiner—Joseph Golian
Attorney, Agent, or Firm—Oblon, Spivak, McClelland, Maier & Neustadt

[57] ABSTRACT

By adding lecithin and/or a surfactant having an HLB value of not greater than 6 either before or during the addition of a peptide sweetener to a heated and melted fat or oil, the problems of viscosity increase and gelation may be overcome even when the sweetener is added in large amounts and has a small particle size.

6 Claims, No Drawings

METHOD FOR PREPARING FAT-AND-OIL-COATED SWEETENER COMPOSITIONS AND COMPOSITIONS SO PREPARED

BACKGROUND OF THE INVENTION

1. Field of the Invention

The present invention relates to an improved method for preparing fat-and-oil-coated sweetener compositions, for improving heat stability, and the compositions so prepared.

2. Discussion of the Background

For improving the heat stability of peptide type sweeteners, such as aspartame, etc., in which heat stability comes into question, the following methods have been attempted or are known.

(1) A sweetener (such as, e.g., aspartame) is mixed with heated and melted oils and fats, and the mixture is cooled to solidify as is or after spreading to obtain a flat plate. The solid is then ground into a powder.

(2) A powdery sweetener is granulated into dens spherical particles using a special device, and the surface is then coated with heated and melted oils and fats (Japanese Patent Application Kokai No. 2-500165).

(3) A method for spray cooling in which a sweetener (such as, e.g. aspartame) is mixed with heated and melted oils and fats, and the mixture is cooled to solidify by spraying into the air to obtain spherical particles.

However, the methods described above suffer from the following problems, respectively.

(1) According to the first method, the particles are obtained by mechanical grinding, so that no spherical particles are obtained. The particles have a large surface area, and their shape is also complicated and hence, any good coating effect with oils and fats cannot be expected. When aspartame is mixed in a high concentration, the viscosity markedly increases or gelation occurs so that handling becomes difficult.

(2) According to the second method, the coating effect is good but a graining step with a special device is required as a pretreatment so that the method is costly.

(3) The third method fails to increase the concentration of aspartame as will be later described. As a result, it is required to increase the amount of the oils and fats-coated particles incorporated into the food, resulting in an economical disadvantage. Furthermore, since the amount of oils and fats used becomes large, such might adversely affect the food to which the composition is added.

That is, in view of the coating effect, it is most advantageous that the oils-and-fats-coated particles have a spherical shape. As the method, there is generally known Method (3) in which cooling to solidify by spraying the mixture into the air (spray cooling method). In this case, the smaller the particle diameter of the core material, the higher the coating effect. In the case of a nucleic acid, etc., the particle diameter of a nucleic acid as the core material is reduced to 5% or smaller based on the particle diameter of a coating material (Japanese Patent Application Kokai No. 61-238335), whereby a high coating effect and an effect of reducing the rate of eluting into water are achieved. In the case that the coating property of aspartame is improved by this method, however, aspartame having a small particle diameter causes gelation of melted oils and fats or causes a marked increase of the viscosity, even in a low concentration (in the case of aspartame having an average particle diameter of 10 micron or less, the viscosity increase is remarkable even in a concentration of about 5% by weight). Such a viscosity increase becomes a serious obstacle in spraying.

Thus, there remains a need for a method of preventing the increase in viscosity or gelation which is a problem inherently involved in using aspartame or the like as the core material, so that good fluidity is maintained to make spraying possible, thereby to obtain spherical particles having an excellent coating effect.

SUMMARY OF THE INVENTION

Accordingly, it is one object of the present invention to provide a method, for preparing sweetener compositions, which allows the preparation of spherical particles.

It is another object of the present invention to provide a method for preparing sweetener compositions, which have excellent coating properties.

It is another object of the present invention to provide a method for preparing sweetener compositions, which reduces the increase in viscosity or gelation when aspartame having a small particle size is added, to heated and melted oils and fats, even in large amounts.

It is another object to provide sweetener compositions prepared by such a method.

These and other objects, which will become apparent during the course of the following detailed description, have been achieved by the inventors' discovery that by adding lecithin or a surfactant having an HLB value of not greater than 6 upon suspension of aspartame in heated and melted oils and fats, the viscosity increase can be prevented to obtain spherical particles having an excellent coating effect.

DETAILED DESCRIPTION OF THE PREFERRED EMBODIMENTS

In the present invention, peptide-type sweeteners, such as aspartame, etc., which are poor in heat stability and cause an increase of viscosity when mixed with heated and melted oils and fats are used as the core material to be coated.

The oils and fats used as the coating material are solid fats having a high melting point, such as hardened beef tallow, hardened vegetable oil, etc. Oils and fats having a melting point of 50° to 100° C. are preferably used.

The particle diameter of aspartame, etc., which is the core material is preferably as small as possible in regard to the aspect of the coating effect. However, taking into account also the stability when the core material melts out by heat, it is expected that the stability might be worsened when the diameter is too small. It is thus generally desired that the particle diameter be in a range of 5 to 50 micron, preferably 10 to 40 micron.

The lecithin added is not particularly limited but may be yolk lecithin, soybean lecithin and so on. Examples of surfactants having an HLB value of 6 or less include sucrose fatty acid esters, monoglycerides, polyglycerides, sorbitan fatty acid esters, etc.

The amount of lecithin and other surfactant added is 0.1 to 5.0 wt.%, preferably 0.3 to 3.0 wt.%, based on the total weight of the oils and fats and core material. The peptide-type sweetener is added in an amount of 1 to 30 wt.%, preferably 5 to 25 wt.%, based on the combined weight of the sweetener and the oil or fat. The remainder of the composition is suitably the fat or oil.

The time for adding lecithin and the surfactant to the melted oils and fats may be any period during the heating of the oils and fats, or during the adding and mixing of the core material, etc. In short, it is sufficient that lecithin and the surfactant be present when the core material is suspended in the melted oils and fats.

Spray cooling for forming the coated particles may be performed in a conventional manner but is not particularly limited.

Having generally described this invention, a further understanding ca be obtained by reference to certain specific examples which are provided herein for purposes of illustration only and are not intended to be limiting unless otherwise specified.

EXAMPLE 1

Aspartame powder (area average diameter of about 25 micron; (a)) or aspartame ground to a fine powder (area average diameter of about 10 micron; (b)) were suspended in hardened beef tallow (melting point of 70° C.) heated and melted at 75° to 85° C. and at the same time, a surfactant was added to and mixed with the suspension (amount added: 1 wt.% based on the weight of hardened beef tallow+aspartame) according to the formulation shown in Table 1. With respect to each of the thus-obtained samples, the state of the suspension and spraying were observed. The results are shown in Table 1. In Table 1, the concentration of aspartame is in terms of weight % based on the combined weight of aspartame and beef tallow.

other surfactant was added to and mixed with the mixture according to the formulation shown in Table 2. Each sample was observed with respect to the state of suspension and spraying. The results are shown in Table 2. In Table 2, the concentration of aspartame is given in terms of weight % based on the combined weight of aspartame and beef tallow.

TABLE 2

| | | | Use in Combination with Lecithin | | | | | | | |
|---|---|---|---|---|---|---|---|---|---|---|
| | Concentration of aspartame | Lecithin alone | Sugar ester (1) | Monoglyester (2.8) | Sugar ester (5) | Sorbitan ester (5.3) | Polyglyester (6.5) | Polyglyester (14.5) | Sugar ester (16) | No addition |
| (a) Powder | 5% | ○ | ○ | ○ | ○ | ○ | ○ | ○ | ○ | ○ |
| | 10% | ○ | ○ | ○ | ○ | ○ | ○ | ○ | ○ | △ |
| | 15% | △ | ○ | ○ | ○ | ○ | △ | △ | △ | X |
| | 20% | X | ○ | ○ | △ | △ | △ | X | X | X |
| (b) Ground Powder | 5% | ○ | ○ | ○ | ○ | ○ | ○ | ○ | ○ | △ |
| | 10% | △ | ○ | ○ | ○ | ○ | △ | △ | △ | X |
| | 15% | X | ○ | ○ | △ | △ | △ | X | X | X |
| | 20% | X | ○ | △ | X | X | X | X | X | X |

(Experimental conditions and criteria for judgement are the same as in Example 1)
Amount of surfactant added:
lecithin 1.0% by weight based on weight of aspartame and beef tallow.
other surfactant 1.0% by weight based on weight of aspartame and beef tallow.
Numerical figures within parentheses mean HLB values.

According to the present invention, the suspensions of peptide-type sweetener in oils and fats to which lecithin and/or the surfactant having an HLB value of not greater than 6 are/is added show good fluidity and can be sprayed so that fat-and-oil coated sweetener compositions having good coating properties can be obtained by the spray cooling method. The sweetener compositions prepared by the present method may be used to artificially sweeten foods, especially those which will be exposed to heat.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for preparing a spherical coated sweetener composition comprising:
    mixing an amount of 1 to 30% of a peptide sweetener, an amount of 0.1 to 5.0% of at least one member selected from the group consisting of lecithin and

TABLE 1

| | Concentration of aspartame | Lecithin | Sugar ester (1) | Monoglyester (2.8) | Sugar ester (5) | Sorbitan ester (5.3) | Polyglyester (6.5) | Polyglyester (14.5) | Sugar ester (16) | No addition |
|---|---|---|---|---|---|---|---|---|---|---|
| (a) Powder | 5% | ○ | ○ | ○ | ○ | ○ | ○ | ○ | ○ | ○ |
| | 10% | ○ | ○ | ○ | ○ | ○ | △ | △ | △ | △ |
| | 15% | △ | ○ | △ | △ | △ | △ | X | X | X |
| (b) Ground Powder | 5% | ○ | ○ | ○ | △ | △ | △ | △ | △ | △ |
| | 10% | △ | ○ | △ | △ | △ | X | X | X | X |
| | 15% | X | △ | X | X | X | X | X | X | X |

Numerical figure within parentheses means HLB value:
○: good fluidity, possible to spray
△: viscosity increase is remarkable, impossible to spray
X: gelation, impossible to spray

EXAMPLE 2

In a manner similar to Example 1, each of aspartame (a) and (b) was added to and mixed with hardened beef tallow heated and melted at 75° to 85° C. and at the same time, lecithin alone or in combination with ansurfactants having an HLB value of not greater than 6 with a heated and melted oil or fat to obtain a mixture, wherein said peptide sweetener has a particle diameter of between 5 and 50 μm and said amounts are based on the combined weight of said sweetener and said oil or fat; and spray-cooling said mixture to form the spherical coated sweetener composition.

2. The method of claim 1, wherein said peptide sweetener is aspartame.

3. A spherical coated sweetener composition prepared by a method which comprises:

mixing an amount of 1 to 30% of a peptide sweetener, an amount of 0.1 to 5.0% of at least one member selected from the group consisting of lecithin and surfactants having an HLB value of not greater than 6 with a heated and melted oil or fat to obtain a mixture, wherein said peptide sweetener has a particle diameter of between 5 and 50 μm and said amounts are based on the combined weight of said sweetener and said oil or fat; and spray-cooling said mixture to form the spherical coated sweetener composition.

4. The spherical coated sweetener composition of claim 3, wherein said peptide sweetener is aspartame.

5. A sweetener composition, comprising:
(a) 1 to 30% of a peptide sweetener;
(b) 0.1 to 5.0% of at least one member selected from the group consisting of lecithin and surfactants having an HLB value of not greater than 6; and
(c) an oil or fat; wherein said oil or fat is present as a coating on said sweetener and said sweetener has a particle diameter of between 5 and 50 μm.

6. The composition of claim 5, wherein said sweetener is aspartame.

* * * * *